US008333947B2

United States Patent
Ohta et al.

(10) Patent No.: US 8,333,947 B2
(45) Date of Patent: *Dec. 18, 2012

(54) METHOD OF MANUFACTURING CARBON NANOTUBES

(75) Inventors: Kazuchika Ohta, Nagano (JP); Ick-Soo Kim, Nagano (JP); Byoung-Suhk Kim, Nagano (JP); Jongchul Park, Seoul (KR)

(73) Assignee: Shinshu University, Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,252

(22) Filed: Aug. 3, 2009

(65) Prior Publication Data

US 2010/0296996 A1 Nov. 25, 2010

Related U.S. Application Data (63) Continuation-in-part of application No. PCT/JP2009/059389, filed on May 21, 2009.

(51) Int. Cl.
*D01F 9/12* (2006.01)
*B01J 19/08* (2006.01)

(52) U.S. Cl. ............... 423/447.1; 977/842; 977/844; 204/157.47

(58) Field of Classification Search .... 423/447.1–447.3, 423/445 B; 977/742–754, 842–848; 428/367; 204/157.47

See application file for complete search history.

(56) References Cited

U.S. PATENT DOCUMENTS

| 5,736,092 | A | * | 4/1998 | Apte et al. ............... 264/432 |
| 6,066,290 | A | * | 5/2000 | Dennis et al. ............ 419/38 |
| 2007/0140947 | A1 | | 6/2007 | Schneider et al. |
| 2008/0233041 | A1 | | 9/2008 | Jang et al. |

FOREIGN PATENT DOCUMENTS

| JP | 6040711 A | 2/1994 |
| JP | 6080391 B | 10/1994 |
| JP | 6287010 A | 10/1994 |
| JP | 2007145674 A | 6/2007 |
| JP | 2007516923 A | 6/2007 |
| JP | 2008044840 A | 2/2008 |
| JP | 2008273807 A | 11/2008 |
| JP | 2008280195 A | 11/2008 |

OTHER PUBLICATIONS

Park, et al., Effects of iron catalyst on the formation of crystalline domain during carbonization of electrospun acrylic nanofiber, Synthetic Metals 2005; 150: 265-270.*
Ko, et al., Purification of multi-walled carbon nanotubes through microwave heating of nitric acid in a closed vessel, Carbon 2005; 43: 727-733.*

(Continued)

*Primary Examiner* — Daniel C. McCracken
(74) *Attorney, Agent, or Firm* — Lowe Hauptman Ham & Berner LLP (57) ABSTRACT

A method for manufacturing carbon nanotubes includes the steps of: preparing metal-containing-nanofibers which include nanofibers made of organic polymer and metal which possesses a catalytic function in forming carbon nanotubes; and forming carbon nanotubes which contain metal therein by using the nanofibers as a carbon source, wherein the carbon nanotubes are formed by putting the metal-containing-nanofibers into a heating vessel which has a substance capable of converting electromagnetic energy into heat, and by heating the metal-containing-nanofibers using heat which is generated by the heating vessel when electromagnetic energy is applied to the heating vessel.

17 Claims, 5 Drawing Sheets

OTHER PUBLICATIONS

Geng, et al., Direct conversion of nickel stearate into carbon nanotubes or pure-phase metallic Ni nanoparticles encapsulated in polyhedral graphite cages, J. Mater. Chem. 2005; 15: 844-849.*

GCMEA (Global Congress on Microwave Energy Applications) Aug. 4-8, 2008 MAJIC 1st Proceedings, "The New Flame for Humanity".

Junfeng Geng et al., "Direct conversion of nickel stearate into carbon nanotubes or pure-phase metallic Ni nanoparticles encapsulated in polyhedral graphite cages," J. Matter Chem., 2005, 15, pp. 844-849.

Jin-Huan Huang et al., "Selective growth of carbon nanotubes on nickel oxide templates created by atomic force microscope nano-oxidation," Diamond & Related Materials, 14, 2005, pp. 744-748.

Chia-Chih Chuang et al., "The role of Ti interlayer in carbon nanotube growth," Surface & Coatings Technology, 202, 2008, pp. 2121-2125.

Chuilin Lai et al., "Growth of carbon nanostructures on carbonized electrospun nanofibers with palladium nanoparticles," Nanotechnology, 19, 2008, pp. 2-7.

Haoqing Hou et al., "Carbon nanotubes on carbon nanofibers: A novel structure based on electrospun polymer nanofibers," Adv. Mater., 2004, 16, No. 1, Jan. 5, pp. 69-73.

* cited by examiner

METHOD OF MANUFACTURING CARBON NANOTUBES

RELATED APPLICATIONS

The present application is a continuation-in-part of International Application Number PCT/JP2009/059389 filed May 21, 2009, the disclosure of which is hereby incorporated by reference herein in its entirety.

TECHNICAL FIELD

The present invention relates to a method for manufacturing carbon nanotubes. To be more specific, the present invention relates to a method for manufacturing carbon nanotubes within a short time using an inexpensive heating device such as a microwave oven for household use. Here, the term "carbon nanotubes" used in this specification, Claims and the like includes not only carbon nanotubes but also carbon nanocapsules.

BACKGROUND OF THE INVENTION

Carbon nanotubes are generally manufactured by an arc discharge method, a laser abrasion method, a chemical vapor deposition method (CVD method) or the like. Besides these methods, there has been also reported a method which manufactures carbon nanotubes made of nickel stearate using an electric furnace (see non-patent literature 1).

This method can manufacture carbon nanotubes by heating nickel stearate in an electric furnace under argon atmosphere at a temperature of 800° C. to 1000° C.

Non-Patent Literature: Junfeng Geng and two others, "Journal of Materials Chemistry", 2005, vol. 15, p. 844-849.

DISCLOSURE OF THE INVENTION

Problems to be Solved by the Invention

According to the method described in non-patent document 1, it is possible to manufacture carbon nanotubes under mild conditions using an inexpensive heating device compared to an arc discharge method, a laser abrasion method or a CVD method. However, in manufacturing carbon nanotubes using an electric furnace, the increase of temperature up to the formation temperature for forming carbon nanotubes from room temperature takes an extremely long time such as several hours, and the lowering of the temperature to room temperature after forming carbon nanotubes also takes an extremely long time such as several hours. Further, there has also been a demand for the introduction of a method for manufacturing carbon nanotubes using a heating device which is less expensive than an electric furnace.

The present invention has been made under such circumstances, and it is an object of the present invention to provide a method for manufacturing carbon nanotubes within a short time using an inexpensive heating device.

Means for Solving the Problems

The inventors of the present invention have made extensive studies to achieve the above-mentioned object, and have completed the present invention based on the following finding. That is, it was found that by applying electromagnetic energy to metal-containing-nanofibers which include nanofibers and a catalyst for forming carbon nanotubes in an environment where electromagnetic energy is converted into heat, it is possible to manufacture carbon nanotubes using an inexpensive heating device within an extremely short time of approximately 10 minutes.

The present invention has been made based on such finding.

[1] According to one aspect of the present invention, there is provided a method for manufacturing carbon nanotubes which includes the steps of: preparing metal-containing-nanofibers which include nanofibers made of organic polymer and metal which possesses a catalytic function in forming carbon nanotubes: and forming carbon nanotubes which contain metal therein by using the nanofibers as a carbon source, wherein the carbon nanotubes are formed by putting the metal-containing-nanofibers into a heating vessel which has a substance capable of converting electromagnetic energy into heat, and by heating the metal-containing-nanofibers using heat which is generated by the heating vessel when electromagnetic energy is applied to the heating vessel.

According to the method for manufacturing carbon nanotubes of the present invention, it is possible to manufacture carbon nanotubes using an inexpensive device within a short time. Further, according to the method for manufacturing carbon nanotubes of the present invention, the nanofibers contained in the metal-containing-nanofibers are used as a carbon source and hence, no other carbon source is necessary except for the metal-containing-nanofibers whereby the present invention also has an advantageous effect that the manufacturing steps can be simplified.

[2] In the above-mentioned method for manufacturing carbon nanotubes, the method may preferably further include a step of placing the metal-containing-nanofibers in the heating vessel between the step of preparing metal-containing-nanofibers and the step of forming carbon nanotubes.

[3] In the above-mentioned method for manufacturing carbon nanotubes, in the step of placing the metal-containing-nanofibers in the heating vessel, the metal-containing-nanofibers may preferably be placed in the heating vessel by putting the metal-containing-nanofibers into a reaction vessel and then placing the reaction vessel in the heating vessel.

[4] In the above-mentioned method for manufacturing carbon nanotubes, in the step of forming carbon nanotubes, while the heating vessel generates heat by applying the electromagnetic energy to the heating vessel, the metal-containing-nanofibers may preferably gradually pass through the heating vessel so that the metal-containing-nanofibers are heated.

[5] In the above-mentioned method for manufacturing carbon nanotubes, in the step of forming carbon nanotubes, a heat-resistant tube is arranged so that a predetermined longitudinal portion of the heat-resistant tube is positioned in the heating vessel and the reaction vessel which contains the metal-containing-nanofibers is gradually moved in the heat-resistant tube in the longitudinal direction so that the metal-containing-nanofibers may preferably gradually pass through the heating vessel.

[6] In the above-mentioned method for manufacturing carbon nanotubes, the metal may preferably be at least one metal selected from a group consisting of iron, cobalt and nickel.

[7] In the above-mentioned method for manufacturing carbon nanotubes, the metal may preferably be nickel.

[8] In the above-mentioned method for manufacturing carbon nanotubes, the metal-containing-nanofibers may preferably be formed such that surfaces of nanofibers are coated with the metal.

[9] In the above-mentioned method for manufacturing carbon nanotubes, the metal-containing-nanofibers may preferably be formed such that metal nanoparticles are contained in the nanofibers.

[10] In the above-mentioned method for manufacturing carbon nanotubes, the metal-containing-nanofibers may preferably be formed by an electro-spinning method which uses a solution or a suspension containing the metal and a resin of the nanofibers therein as materials.

[11] In the above-mentioned method for manufacturing carbon nanotubes, the step of forming carbon nanotubes may preferably be carried out in an inert-gas atmosphere.

[12] In the above-mentioned method for manufacturing carbon nanotubes, the step of forming carbon nanotubes may preferably include a step of maintaining the inside of the heating vessel at a temperature of 600° C. to 900° C. for 5 to 20 minutes.

[13] In the above-mentioned method for manufacturing carbon nanotubes, in the step of forming carbon nanotubes, the inside of the heating vessel may preferably be heated at a temperature of 600° C. to 900° C., and the metal-containing-nanofibers gradually pass thorough the heating vessel for 5 to 20 minutes.

[14] According to another aspect of the present invention, there is provided a method for manufacturing carbon nanotubes which includes the steps of: preparing metal-containing-nanofibers which include nanofibers made of organic polymer and metal which possesses a catalytic function in forming carbon nanotubes; and forming carbon nanotubes which contain metal therein by using the nanofibers as a carbon source and by heating the metal-containing-nanofibers.

Also by such a method for manufacturing carbon nanotubes of the present invention, it is possible to manufacture carbon nanotubes within a short time. Further, according to the method for manufacturing carbon nanotubes of the present invention, the nanofibers contained in the metal-containing-nanofibers are used as a carbon source and hence, no other carbon source is necessary except for the metal-containing-nanofibers and hence, the present invention also has an advantageous effect that the manufacturing steps can be simplified.

Also the method for manufacturing carbon nanotubes described in the above-mentioned paragraph [14] may preferably possess the technical features described in paragraphs [6] to [11] in the same manner as the method for manufacturing carbon nanotubes described in the above-mentioned paragraph [1].

BEST MODE FOR CARRYING OUT THE INVENTION

A method for manufacturing carbon nanotubes of the present invention is explained hereinafter based on embodiments shown in drawings.

[Embodiment 1]

Figure 1:
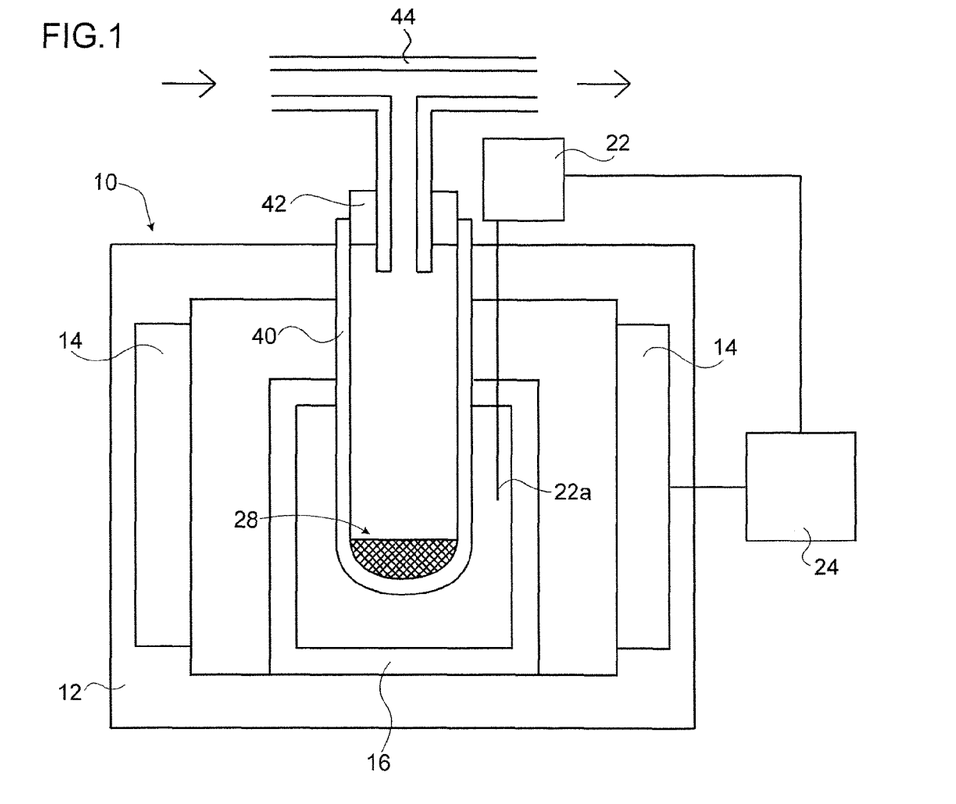
FIG. 1 is a schematic cross-sectional view of a manufacturing apparatus for manufacturing carbon nanotubes according to an embodiment 1.

FIG. 1 is a schematic cross-sectional view of a manufacturing apparatus 10 used in a method for manufacturing carbon nanotubes according to an embodiment 1. The manufacturing apparatus 10 includes, as shown in FIG. 1, an outer vessel 12, an electromagnetic source 14, a heating vessel 16, a thermocouple 22, and a control unit 24.

The electromagnetic source 14 is a device which generates electromagnetic energy and is comprising a magentron and a wave-guide (not shown in the drawing). The manufacturing apparatus 10 shown in FIG. 1 is equipped with two units of electromagnetic sources on both sides of the outer vessel 12 so that the intensity of the microwave energy within the outer vessel 12 becomes homogeneous. In a simplified configuration, the electromagnetic source can be just one, instead of two. In such configuration, the electromagnetic source 14 can be mounted on the upper wall of the outer vessel 12, like a microwave oven for household use.

In manufacturing carbon nanotubes, metal-containing-nanofibers 28 which include nanofibers made of an organic polymer and metal which possesses a catalytic function in forming carbon nanotubes are prepared. Thereafter, a quartz glass tube (reaction vessel) 40 which puts metal-containing-nanofibers 28 therein is placed in the heating vessel 16. Metal-containing-nanofibers 28 are used as a material for manufacturing carbon nanotubes. As metal which possesses a catalytic function in forming carbon nanotubes, at least one metal selected from a group consisting of iron, cobalt and nickel can be named.

The quartz glass tube 40 can also be made of other materials than quartz glass such as ceramics so long as the material withstands a high temperature.

The outer vessel 12 has a function of confining electromagnetic energy applied from the electromagnetic source 14 in the inside thereof. The electromagnetic source 14 applies electromagnetic energy corresponding to intensity and an energy applying time of electromagnetic energy controlled by the control unit 24. A microwave oven for household use includes the outer vessel 12, the electromagnetic source 14 and the control unit 24. Accordingly, in the method for manufacturing carbon nanotubes of the embodiment 1, it is possible to use such a microwave oven for household use. By using the microwave oven for household use, the manufacturing apparatus for manufacturing carbon nanotubes becomes inexpensive. Although the kind of electromagnetic energy applied from the electromagnetic source 14 is not particularly limited, it is preferable to use microwaves for increasing the speed of temperature increase, that is, the speed at which carbon nanotubes are formed.

The heating vessel 16 is a device to heat objects therein by converting electromagnetic energy to heat. The heating vessel 16 has an approximately hollow columnar shape, a hole is formed in a top plate of the heating vessel 16, and an inner surface of a side wall made of a heat insulation material (not shown in the drawing) is coated with a substance which converts electromagnetic energy into heat. As the substance which converts electromagnetic energy into heat, alumina, mullite, ferrite, silicon nitride, silicon carbide and the like can be named. In place of covering an inner surface of the heating vessel 16 with a substance which converts electromagnetic energy into heat, the heating vessel 16 per se may be formed using a substance which converts electromagnetic energy into heat, or a substance which converts electromagnetic energy into heat may be dispersed or impregnated into a wall of the heating vessel 16.

The control unit 24 controls the intensity and the energy applying time of electromagnetic energy applied from the electromagnetic source 14. In the method for manufacturing carbon nanotubes according to the embodiment 1, based on information relating to the temperature in the heating vessel 16 measured by the thermocouple 22, the control unit 24 performs a control such that the temperature at which carbon nanotubes are formed, for example, a predetermined temperature of 600° C. to 900° C., is maintained for a predetermined time, for example, for 5 to 20 minutes.

Metal-containing-nanofibers 28 which include nanofibers made of organic polymer and at least one metal selected from a group consisting of iron, cobalt and nickel are put into a quartz glass tube 40, and the quartz glass tube 40 is placed in the heating vessel 16. Nanofibers made of organic polymer in the metal-containing-nanofibers 28 function as a carbon source of carbon nanotubes, and at least one metal selected from a group consisting of iron, cobalt and nickel functions as a catalyst for forming carbon nanotubes.

As metal-containing-nanofibers 28, for example, nanofibers whose surfaces are coated with at least one metal selected from a group consisting of iron, cobalt and nickel by a vapor deposition method, or nanofibers in which nanoparticles of at least one metal selected from a group consisting of iron, cobalt and nickel are contained can be named.

Nanofibers are formed by a method used in general for forming nanofibers such as an electro-spinning method, a melt blown method or the like, for example. As a material of nanofibers, for example, polyethylene, polystyrene, polypropylene, polyethylene terephthalate, polybutylene terephthalate, polyethylene naphthalate, polyamide, polyurethane, polyvinyl alcohol, polyacrylonitrile, polyether imide, polycaprolactone, polylactic acid, polylactic acid glycolic acid or the like can be named.

Metal-containing-nanofibers in which the surfaces of the nanofibers are coated with metal are manufactured by coating the nanofibers with metal employing a metal coating method in general use such as a vapor deposition method, for example. On the other hand, metal-containing-nanofibers in which metal nanoparticles are contained are manufactured by an electro-spinning method which uses a suspension containing metal nanoparticles and a material resin of nanofibers, for example, a suspension which is formed by dispersing metal nanoparticles in a solution in which a material resin of nanofibers is dissolved as a material. A method for manufacturing nanofibers and a method for manufacturing metal-containing-nanofibers which are formed by enclosing metal nanoparticles in nanofibers by an electro-spinning method are explained later.

The quartz glass tube 40 can withstand an atmosphere under a temperature at the time of forming carbon nanotubes. A gas introducing tube 44 is inserted into an opening portion of the quartz glass tube 40 by way of a plug 42. At the time of forming the carbon nanotubes and before and after the formation of the carbon nanotubes, an inert gas, for example, a noble gas such as helium or argon or a nitrogen gas is fed to the quartz glass tube 40 through the gas introducing pipe 44, and a gas in the quartz glass tube 40 is replaced with the inert gas. The gas in the quartz glass tube 40 is replaced with the fed inert gas for forming carbon nanotubes while preventing an oxidation reaction.

The method for manufacturing carbon nanotubes according to the embodiment 1 is carried out in accordance with following steps. First of all, metal-containing-nanofibers 28 are put into the quartz glass tube 40 and, thereafter, an opening portion of the quartz glass tube 40 is closed by the plug 42 into which the gas introducing pipe 44 is inserted. Next, the quartz glass tube 40 is made so that it passes through the hole formed in the top plate of the outer vessel 12, and the quartz glass tube 40 is fixed at a position where metal-containing-nanofibers 28 are arranged in the heating vessel 16.

Then, the tip 22a of the thermocouple 22 is brought into an area close to metal-containing-nanofibers 28 in a state where the tip 22a of the thermocouple 22 passes through the hole formed in the outer vessel 12 and the hole formed in the top plate of the heating vessel 16 (both holes not shown in the drawing) from the outside of the manufacturing apparatus 10. Next, an inert gas is fed to the gas introducing pipe 44. When the gas in the quartz glass tube 40 is sufficiently replaced by the inert gas, the control unit 24 performs a control so as to allow the electromagnetic source 14 to apply electromagnetic energy.

The electromagnetic energy applied from the electromagnetic source 14 is applied to the heating vessel 16 so that the electromagnetic energy is converted into heat. A temperature in the heating vessel is rapidly elevated due to this heat, and the temperature in the heating vessel arrives at a carbon nanotubes forming temperature, for example, a desired predetermined temperature of 600° C. to 900° C., within 5 minutes from starting the heating, for example. Then, using the control unit 24, the inside of the heating vessel 16 is maintained at a predetermined temperature which generates carbon nanotubes for several minutes, for example, 5 to 20 minutes.

Thereafter, the application of electromagnetic energy from the electromagnetic source 14 is stopped. When several minutes elapse after the application of electromagnetic energy is stopped, the inside of heating vessel 16 is cooled down to a temperature close to a room temperature. Then, the quartz glass tube 40 is taken out from the outer vessel 12. Thus, carbon nanotubes which contain metal are formed from metal-containing-nanofibers 28. As described above, by putting metal-containing-nanofibers which include the metal catalyst and nanofibers into the quartz glass tube, by applying electromagnetic energy to the heating vessel so as to elevate the temperature in the heating vessel up to the temperature at which carbon nanotubes are formed, and by maintaining the carbon nanotubes formation temperature, it is possible to manufacture carbon nanotubes within a short time.

Figure 2:
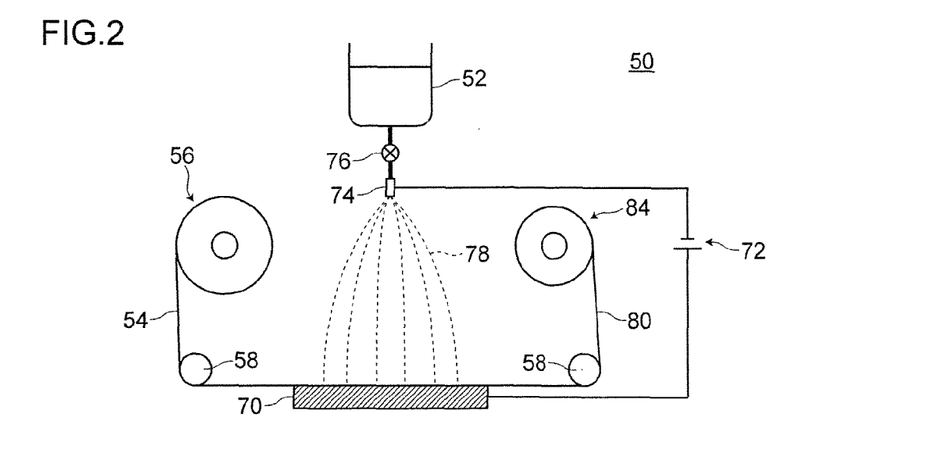
FIG. 2 is a schematic view of an electro-spinning device according to the embodiment 1.
Figure 3A:
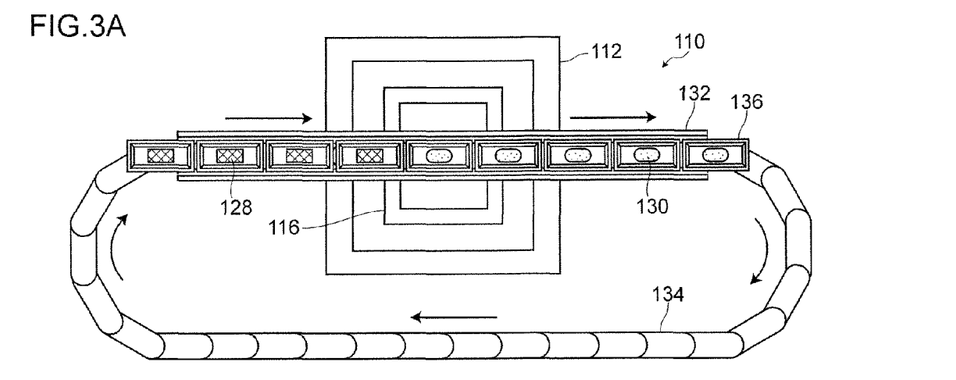
FIG. 3 is a schematic view for explaining a manufacturing apparatus for manufacturing carbon nanotubes according to an embodiment 2.
Figure 3B:
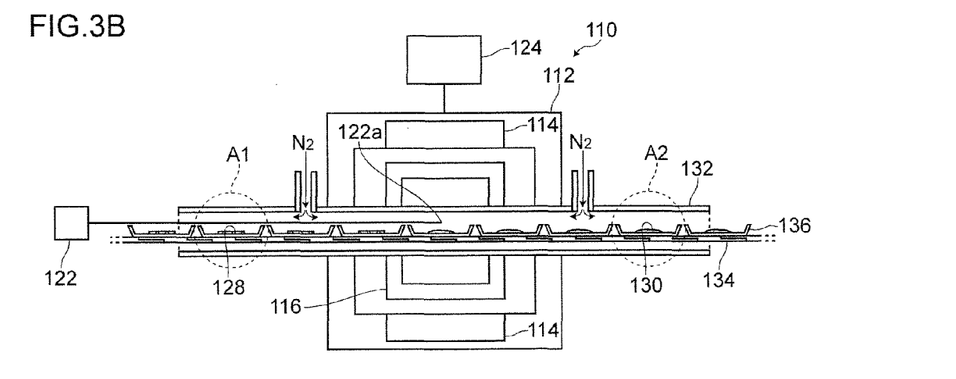
Figure 3C:
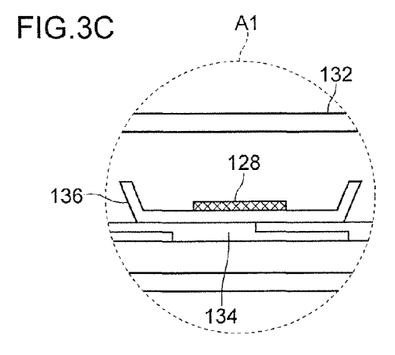
Figure 3D:
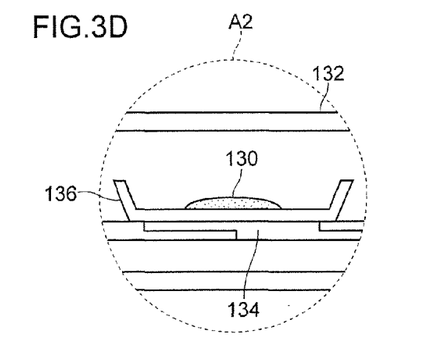

FIG. 2 is a schematic view of an electro-spinning device 50 used in the embodiment 1. Nanofibers used in the embodiment 1 are manufactured in accordance with following steps using the electro-spinning device 50. Firstly, a material resin of nanofibers is fed to a tank 52 in a state where the material resin is dissolved in a solvent. Next, a substrate 54 is paid off from a pay-off roll 56 around which the substrate 54 is wound.

Then, when the substrate 54 passes an area above a counter-electrode 70 by way of a feed roller 58, a valve 76 is opened to jet a resin solution 78 toward the substrate 54 from the nozzle 74 in a state where a high voltage is applied between a nozzle 74 and the counter-electrode 70 by a high-voltage power source 72. The resin solution 78 jetted from the nozzle 74 is formed into nanofibers on the substrate 54.

The solvent is evaporated in the midst of jetting toward the substrate 54 from the nozzle 74. Further, the counter-electrode 70 is heated by a heater (not shown in the drawing) and hence, even when the solvent remains in the nanofibers, such a solvent is evaporated by heat from the heater. In this manner, a stacked sheet 80 formed of the substrate 54 and a nanofiber layer is obtained. Thereafter, the stacked sheet 80 is wound around a winding-side roll 84 by way of a feed roller 58.

Further, in manufacturing metal-containing-nanofibers 28 in which metal nanoparticles are contained in nanofibers, a suspension which is formed by dispersing metal nanoparticles in a solution in which a material resin of nanofibers is dissolved is fed into the tank 52. Except for this one point, steps of manufacturing metal-containing-nanofibers 28 are equal to the steps of manufacturing nanofibers.

[Embodiment 2]

FIG. 3 is a schematic view for explaining a manufacturing apparatus 110 used in a method for manufacturing carbon nanotubes according to the embodiment 2. FIG. 3(*a*) is a schematic view of the manufacturing apparatus 110 as viewed from above, FIG. 3(*b*) is a cross-sectional view of the manufacturing apparatus 110 as viewed from a front side, FIG. 3(*c*) is an enlarged view of a portion in FIG. 3(*b*) indicated by symbol A1, and FIG. 3(*d*) is an enlarged view of a portion in FIG. 3(*b*) indicated by symbol A2. FIG. 3 shows the interior of the manufacturing apparatus 110 which is manufacturing carbon nanotubes.

The manufacturing apparatus 110 includes, as shown in FIG. 3, an outer vessel 112, an electromagnetic source 114, a heating vessel 116, a thermocouple 122, a control unit 124 and a quartz glass tube 132 as a heat resistant tube. The quartz glass tube 132 is mounted such that a predetermined longitudinal portion of the quartz glass tube 132 is positioned in the heating vessel 116.

The electromagnetic source 114 is a device which generates electromagnetic energy and is comprising a magentron and a wave-guide (not shown in the drawing). The manufacturing apparatus 110 shown in FIG. 3 is equipped with two units of electromagnetic sources on both sides of the outer vessel 112 so that the intensity of the microwave energy within the outer vessel 112 becomes homogeneous. In a simplified configuration, however, the electromagnetic source can be just one, instead of two. In such configuration, the electromagnetic source 14 can be mounted on the upper wall of the outer vessel 112, like a microwave oven for household use.

In manufacturing carbon nanotubes, first of all, metal-containing-nanofibers 128 (for example, unwoven cloth) which includes nanofibers made of organic polymer and metal which possesses a catalytic function in forming carbon nanotubes is prepared. Thereafter, in a state where the heating vessel 116 generates heat due to the application of electromagnetic energy to the heating vessel 116, a quartz glass-made boat (reaction vessel) 136 which puts metal-containing-nanofibers 128 therein is gradually moved in the quartz glass tube 132 in the longitudinal direction. As a result, metal-containing-nanofibers 128 gradually pass a space in the heating vessel 116 so that metal-containing-nanofibers 128 are efficiently heated. Here, the quartz glass-made boat 136 is moved by placing the quartz glass-made boat 136 on a quartz glass-made conveyer 134 which gradually advances in the direction indicated by an arrow by a drive means not shown in the drawing. Metal-containing-nanofibers 128 are a material for manufacturing carbon nanotubes. As metal which possesses a catalytic function in forming carbon nanotubes, at least one metal selected from a group consisting of iron, cobalt and nickel can be named.

A quartz glass-made boat 136 or a quartz glass-made conveyer 134 can also be made of other materials than quartz glass such as ceramics so long as the material withstands a high temperature.

The outer vessel 112 has a function of confining electromagnetic energy applied from an electromagnetic source 114 in the inside thereof. The electromagnetic source 114 applies electromagnetic energy corresponding to intensity and an energy applying time of electromagnetic energy controlled by the control unit 124. Although a kind of electromagnetic energy applied from the electromagnetic source 114 is not particularly limited, it is desirable to use microwaves for increasing a temperature elevation speed, that is, a carbon-nanotubes forming speed.

The heating vessel 116 is a device to heat objects therein by converting electromagnetic energy to heat. The heating vessel 116 has an approximately hollow columnar shape, wherein a hole is formed on both side surfaces, and an inner surface of a wall made of a heat insulating material (not shown in the drawing) is coated with a substance which converts electromagnetic energy into heat. As such a substance which converts electromagnetic energy into heat, alumina, mullite, ferrite, silicon nitride, silicon carbide and the like can be named. In place of covering an inner surface of the heating vessel 116 with a substance which converts electromagnetic energy into heat, the heating vessel 116 per se may be formed using a substance which converts electromagnetic energy into heat, or a substance which converts electromagnetic energy into heat may be dispersed or impregnated into a wall of the heating vessel 116.

The control unit 124 controls intensity and an energy applying time of electromagnetic energy applied from the electromagnetic source 114. In the method for manufacturing carbon nanotubes according to the embodiment 2, based on information relating to a temperature in the heating vessel 116 measured by the thermocouple 122, the control unit 124 performs a control such that a temperature in the heating vessel 116 is maintained at a temperature at which carbon nanotubes are formed, for example, a predetermined temperature of 600° C. to 900° C.

Metal-containing-nanofibers 128 which include nanofibers made of organic polymer and at least one metal selected from a group consisting of iron, cobalt and nickel is put into a quartz glass-made boat 136, and the quartz glass-made boat 136 is placed on a quartz glass-made conveyer 134 which gradually advances in the direction indicated by an arrow in FIG. 3. Nanofibers made of organic polymer function as a carbon source of carbon nanotubes, and at least one metal selected from a group consisting of iron, cobalt and nickel functions as a catalyst for forming carbon nanotubes.

The structures, materials and manufacturing methods of metal-containing-nanofibers 128, nanofibers and metal nanoparticles are equal to the corresponding structures, materials and manufacturing methods exemplified in the embodiment 1, for example.

the quartz glass tube 132 can withstand an atmosphere under a temperature at the time of forming carbon nanotubes. the quartz glass tube 132 includes an inert gas introducing pipe. At the time of forming carbon nanotubes and before and after the formation of carbon nanotubes, an inert gas, for example, a noble gas such as helium or argon or a nitrogen gas is fed to the quartz glass tube 132 so that a gas in the quartz glass tube 132 is replaced with the inert gas. The gas in the quartz glass tube 132 is replaced with the fed inert gas for forming carbon nanotubes while preventing an oxidation reaction.

The method for manufacturing carbon nanotubes according to the embodiment 2 is carried out in accordance with following steps. First of all, an inert gas is fed to the inert gas introducing pipe 44, and a gas in the quartz glass tube 132 is sufficiently replaced with the inert gas. Then, electromagnetic energy is applied to the heating vessel 116 so as to allow the heating vessel 116 to generate heat whereby a predetermined region of the quartz glass tube 132 is elevated to a desired predetermined temperature of 600° C. to 900° C., for example. Here, a tip 122a of the thermocouple 122 is placed in the predetermined region of the quartz glass tube 132, and an output of the control device 124 is controlled based on information relating to a temperature detected by the thermocouple 122. Thereafter, in a state where such a temperature is maintained, the quartz glass-made boat 136 (reaction vessel) which puts metal-containing-nanofibers 128 therein is placed on the quartz glass-made conveyer 134 which gradually advances in the direction indicated by an arrow in FIG. 3.

As a result, metal-containing-nanofibers 128 gradually pass a space in the heating vessel 116 and hence, it is possible to heat metal-containing-nanofibers 128 for a required time. The quartz glass-made boat 136 which has passed the predetermined region of the quartz glass tube 132 is gradually cooled, and is cooled to a temperature close to a room temperature when the quartz glass-made boat 136 arrives at an exit of the quartz glass tube 132. According to the method for manufacturing carbon nanotubes of the embodiment 2, by preparing a plurality of quartz glass-made boats 136 and by sequentially placing these quart boats 136 on the conveyer, it is possible to manufacture carbon nanotubes with high productivity.

EXAMPLE

In the examples described hereinafter, carbon nanotubes are manufactured using the above-mentioned manufacturing apparatus 10 according to the embodiment 1.

1. Manufacturing Apparatus for Manufacturing Carbon Nanotubes

A microwave oven for household use (ES-HA196 made by ZOJIRUSHI CORPORATION) is remodeled and is used as the manufacturing apparatus 10. That is, the microwave oven is remodeled such that the thermocouple 22 is mounted on the microwave oven so as to maintain the inside of the heating vessel 16 at a predetermined temperature, and an operation unit (corresponding to the control unit 24) of the microwave oven is remodeled to adjust an output of electromagnetic energy (microwave energy) based on temperature information obtained from the thermocouple 22. As the heating vessel 16, a kiln (generic name: microwave kiln; product name: Art Box) which elevates a temperature of the inside thereof due to microwaves of the microwave oven is used. The kiln is a two-part body consisting of a bottom portion and a lid portion.

2. Manufacture of Carbon Nanotubes

Example 1

The example 1 is an example which uses metal-containing-nanofibers in which surfaces of nanofibers are coated with metal.

(1) Preparation of Nanofibers

An unwoven fabric made of polystyrene nanofibers is prepared on the substrate 54 by an electro-spinning method which uses a DMF solution of polystyrene (approximately 30% by weight) as a material. A thickness of the obtained unwoven fabric made of nanofibers is 1 to 10 µm, and a diameter of the nanofiber is 500 to 2000 nm. The diameter of the nanofiber is obtained by measuring fiber widths of a large number of nanofibers shown in an electron microscope photograph.

(2) Applying Metal to Surfaces of Nanofibers by Coating

Surfaces of nanofibers prepared on the substrate 54 by a vacuum deposition method are coated with nickel. A thickness of a nickel coating layer is 10 to 300 nm. The thickness of the nickel coating layer is obtained by measuring a thickness of a nickel layer in a microscope photograph showing a cross-section of metal-containing-nanofibers.

(3) Formation of Carbon Nanotubes

In the quartz glass tube 40 having a diameter of 15 mm and a length of 180 mm, metal-containing-nanofibers 28 obtained by the above-mentioned step (nanofibers peeled from the substrate) are put. The quartz glass tube 40 is placed in the kiln installed in the microwave oven. A gas in the quartz glass tube 40 is replaced by a nitrogen gas for 10 minutes. Then, in a state where the inside of the quartz glass tube 40 is under nitrogen gas atmosphere, microwave energy (output: 600 W) is applied to the kiln for 5 minutes thus elevating a temperature in the kiln to 800° C. Subsequently, microwave energy is continuously applied to the kiln thus maintaining the temperature in the kiln at 800° C. for 10 minutes and, thereafter, the application of microwave energy is stopped. When 5 minutes elapse from stopping of application of microwave energy, the temperature in the kiln is lowered to a temperature close to a room temperature. Due to such steps, carbon nanotubes are obtained.

To remove bare nickel metal particles contained in a coarse product of carbon nanotubes obtained in this manner, the coarse product of carbon nanotubes and concentrated hydrofluoric acid are put into a test tube, and the test tube is immersed in a water bath of an ultrasonic cleaning apparatus (UT-105S made by Sharp Corporation) and ultrasonic cleaning is applied to the test tube. Next, after leaving the test tube on a test tube stand overnight, a supernatant liquid is removed. The addition of water and the removal of a supernatant liquid are repeated until cleaning water becomes neutral. Then, the product is dried under reduced pressure thus obtaining carbon nanotubes. A yield of carbon nanotubes calculated based on a carbon content of nanofibers is approximately 4%.

Example 2

The example 2 is an example which uses metal-containing-nanofibers in which metal nanoparticles are contained in nanofibers.

(1) Preparation of Metal-Containing-Nanofibers

Using an electro-spinning method which uses a suspension prepared by dispersing nickel particles having a diameter of 10 to 130 nm in a DMF solution of polystyrene as a material, an unwoven fabric made of metal-containing-nanofibers in which metal nanoparticles are contained in polystyrene nanofibers is prepared. Here, the concentration of polystyrene in the suspension is set to 30% by weight, and the concentration of nickel particles in the suspension is set to 1.0% by weight. The obtained metal-containing nanofiber layer has a thickness of 1 to 10 µm, and a diameter of the metal-containing nanofiber is 600 to 2500 nm. The diameter of the metal-containing nanofiber is obtained by measuring line widths of respective metal-containing-nanofibers shown in an electron microscope photograph.

(2) Formation of Carbon Nanotubes

This example differs from the example 1 only with respect to a point that metal-containing-nanofibers in which metal nanoparticles are contained in nanofibers are put into the quartz glass tube 40. Except for this point, carbon nanotubes are formed using the same method as the example 1.

3. Analysis of Carbon Nanotubes

Figure 4A:
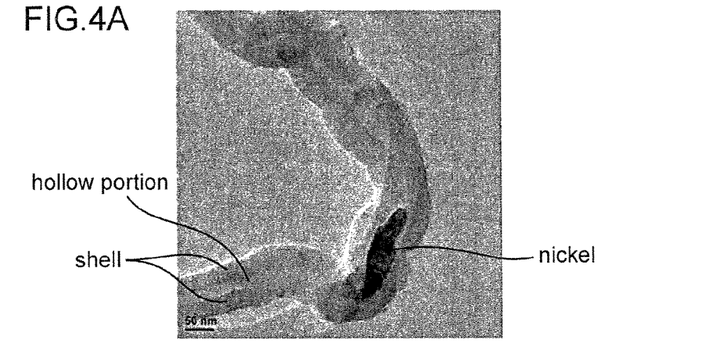
FIG. 4 is a TEM image of carbon nanotubes manufactured in the embodiment 1.
Figure 4B:
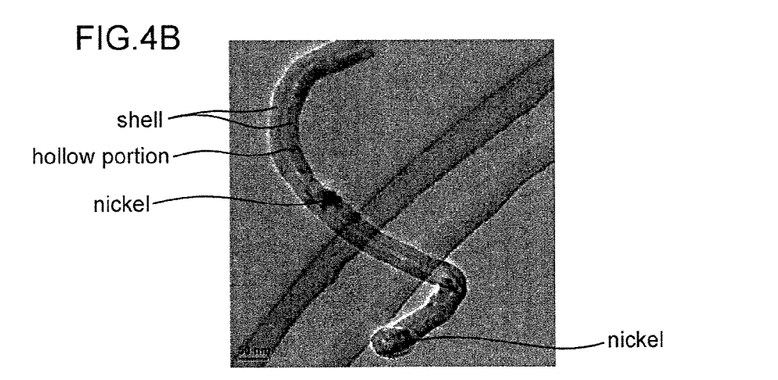
Figure 4C:
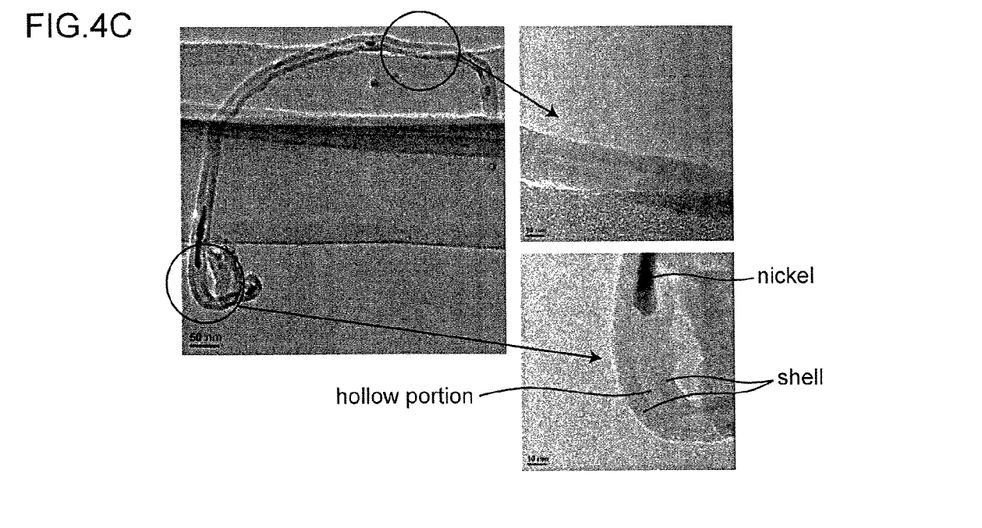

In the example 1, carbon nanotubes and carbon nanocapsules are obtained. FIG. 4A, FIG. 4B and FIG. 4C show TEM images of carbon nanotubes manufactured in the example 1. On the other hand, FIG. 5A and FIG. 5B show TEM images of carbon nanocapsules manufactured in the example 1.

As shown in FIG. 4A, FIG. 4B and FIG. 4C, it is confirmed that carbon nanotubes can be formed by the method used in the example 1. The obtained carbon nanotubes differ in size such that carbon nanotube shown in FIG. 4A has a shell thickness of approximately 42 nm and a hollow-portion diameter of approximately 17 nm, carbon nanotube shown in FIG. 4B has a shell thickness of approximately 47 nm and a hollow-portion diameter of approximately 15 nm, and carbon nanotube shown in FIG. 4C has a shell thickness of approximately 10 nm and a hollow-portion diameter of approximately 5 nm.

Figure 5A:
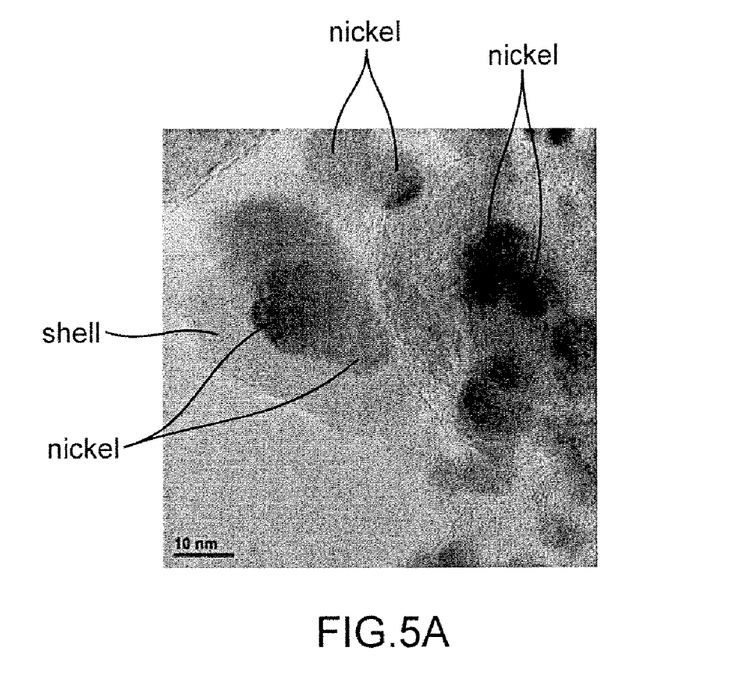
FIG. 5 is a TEM image of carbon nanocapsules manufactured in the embodiment 1.
Figure 5B:
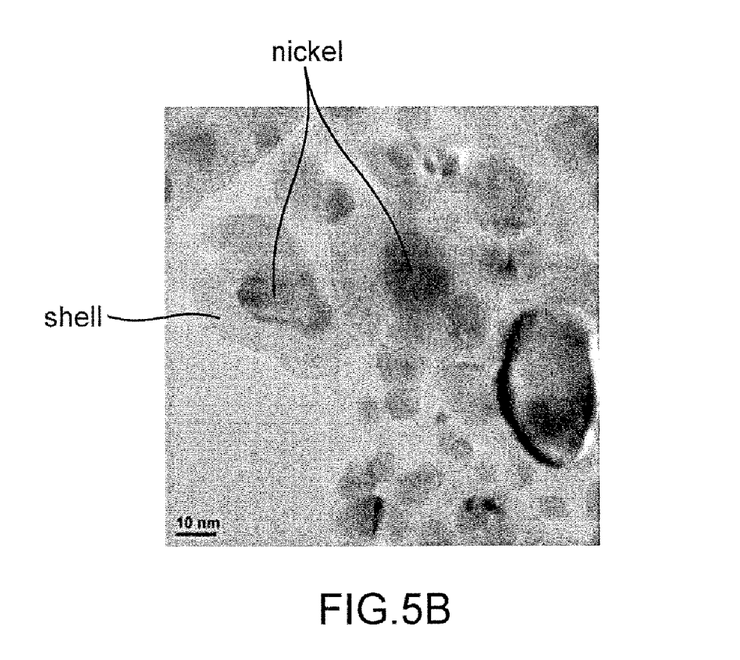

Further, as shown in FIG. 5A and FIG. 5B, it is confirmed that carbon nanocapsules can be formed by the method used in the example 1. The obtained carbon nanocapsule has a shell thickness of approximately 8 nm to 9 nm, and a minute nickel particle having a diameter of approximately 10 nm is contained in a center portion of carbon nanocapsule. Further, as shown in FIG. 4A, FIG. 4B, FIG. 4C, FIG. 5A and FIG. 5B, it is found that carbon nanotubes manufactured in the example 1 contains nickel (black portion of the TEM image) therein.

In the example 1, carbon nanotubes which contain metal therein are manufactured by using, as the starting material, nanofibers whose outer surfaces are coated with metal which functions as the catalyst. In this manner, in the example 1, in spite of the fact that nanofibers which constitute a carbon source is present in the inside of metal which functions as a catalyst in the starting material, carbon nanotubes are formed outside metal which functions as the catalyst in carbon nanotubes which is the final product. This is considered to be brought about by a phenomenon that when nanofibers whose outer surfaces are coated with metal is heated, the vapor of an organic material, that is, nanofibers which is used as a carbon source is ejected from portions of nanofibers which are not coated with metal and this vapor turns into carbon nanotubes around metal which has functioned as the catalyst.

Figure 6A:
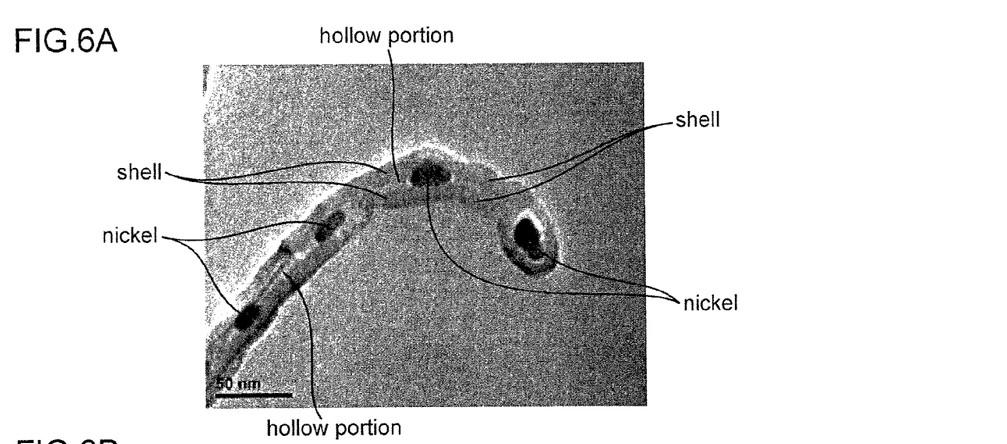
FIG. 6 is a TEM image of carbon nanotubes manufactured in the embodiment 2.
Figure 6B:
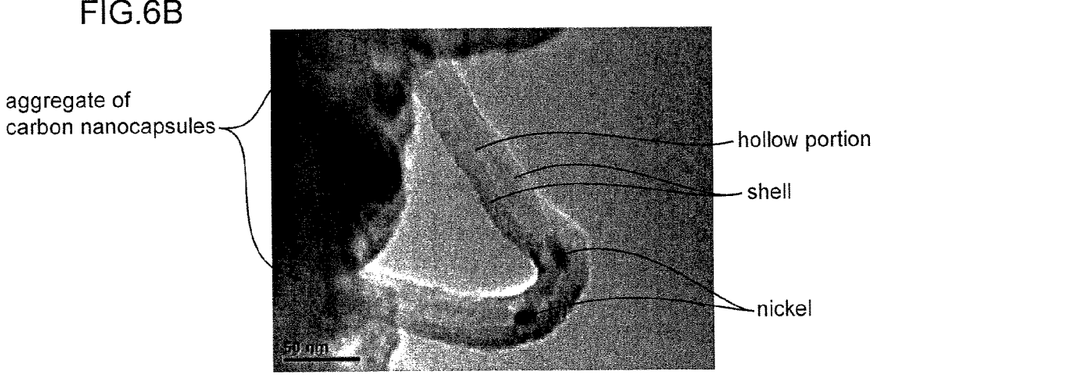
Figure 6C:
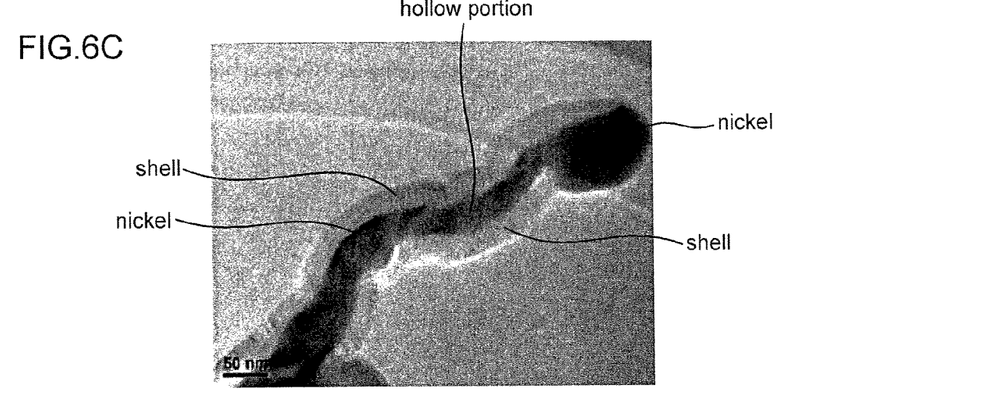

On the other hand, carbon nanotubes and carbon nanocapsules can also be obtained in the example 2. FIG. 6A and FIG. 6C show TEM images of carbon nanotubes manufactured in the example 2. FIG. 6B is a TEM image of carbon nanotubes and carbon nanocapsules manufactured in the example 2. In FIG. 6B, an aggregate of carbon nanocapsules is observed (see a left side of the TEM image). As shown in FIG. 6A, FIG. 6B and FIG. 6C, it is confirmed that carbon nanotubes and carbon nanocapsules can be formed by the method used in the example 2. The obtained carbon nanotubes differ in size such that carbon nanotubes shown in FIG. 6A and FIG. 6B have a shell thickness of approximately 10 nm to 15 nm and a hollow-portion diameter of approximately 10 nm to 15 nm, and carbon nanotube shown in FIG. 6C has a shell thickness of approximately 20 nm to 30 nm and a hollow-portion diameter of approximately 20 nm to 30 nm. Further, as shown in FIG. 6A, FIG. 6B and FIG. 6C, it is found that carbon nanotubes manufactured in the example 2 contain nickel (a black portion in the TEM image) therein.

Carbon nanotubes manufactured in the example 1 and the example 2 are attracted by a magnet. This phenomenon implies that nickel contained in carbon nanotubes is not removed even when the hydrofluoric acid treatment is applied. That is, it is considered that carbon nanotubes manufactured in the example 1 and the example 2 are chemically stable in a state where nickel particles are contained in carbon nanotubes. Accordingly, the method for manufacturing carbon nanotubes according to the present invention can acquire an advantageous effect that carbon nanotubes having magnetism can be selectively manufactured. Carbon nanotubes having magnetism can be broadly used as a toner for a copying machine, a magnetic recording/storing material, a magnetic paint and the like. Besides such applications, carbon nanotubes having magnetism can also be used as an electrode material, a conductivity-imparting agent, an addition agent of a tire and the like.

The invention claimed is:

1. A method for manufacturing carbon nanotubes comprising the steps of:
   preparing metal-containing-nanofibers which include nanofibers made of organic polymer and metal which possesses a catalytic function in forming carbon nanotubes; and
   forming carbon nanotubes which contain metal therein by using the nanofibers as a carbon source, wherein the carbon nanotubes are formed by putting the metal-containing-nanofibers into a heating vessel which has a substance capable of converting electromagnetic energy into heat, and by heating the metal-containing-nanofibers using heat which is generated by the heating vessel when electromagnetic energy is applied to the heating vessel;
   wherein the metal-containing-nanofibers are formed such that surfaces of nanofibers are coated with the metal using a vapor deposition method.

2. A method for manufacturing carbon nanotubes according to claim 1, wherein the method further comprises a step of placing the metal-containing-nanofibers in the heating vessel between the step of preparing metal-containing-nanofibers and the step of forming carbon nanotubes.

3. A method for manufacturing carbon nanotubes according to claim 2, wherein in the step of placing the metal-containing-nanofibers in the heating vessel, the metal-containing-nanofibers are placed in the heating vessel by putting the metal-containing-nanofibers into a reaction vessel and then placing the reaction vessel in the heating vessel.

4. A method for manufacturing carbon nanotubes according to claim 2, wherein the step of forming carbon nanotubes includes a step of maintaining the inside of the heating vessel at a temperature of 600° C. to 900° C. for 5 to 20 minutes.

5. A method for manufacturing carbon nanotubes according to claim 1, wherein in the step of forming carbon nanotubes, while the heating vessel generates heat by applying the electromagnetic energy to the heating vessel, the metal-containing-nanofibers gradually pass through the heating vessel so that the metal-containing-nanofibers are heated.

6. A method for manufacturing carbon nanotubes according to claim 5, wherein in the carbon nanotubes forming step, a heat-resistant tube is arranged so that a predetermined longitudinal portion of the heat-resistant tube is positioned in the heating vessel and the reaction vessel which contains the metal-containing-nanofibers is gradually moved in the heat-resistant tube in the longitudinal direction so that the metal-containing-nanofibers gradually pass through the heating vessel.

7. A method for manufacturing carbon nanotubes according to claim 5, wherein the step of forming carbon nanotubes, the inside of the heating vessel is heated at a temperature of 600° C. to 900° C., and the metal-containing-nanofibers gradually pass thorough the heating vessel for 5 to 20 minutes.

8. A method for manufacturing carbon nanotubes according to claim 1, wherein the metal is at least one metal selected from a group consisting of iron, cobalt and nickel.

9. A method for manufacturing carbon nanotubes according to claim 8, wherein the metal is nickel.

10. A method for manufacturing carbon nanotubes according to claim 1, wherein the step of forming carbon nanotubes is carried out in an inert-gas atmosphere.

11. A method for manufacturing carbon nanotubes according to claim 1, wherein the nanofibers are formed by an electro-spinning method which uses a solution containing a resin of the nanofibers therein.

12. A method for manufacturing carbon nanotubes comprising:
 applying electromagnetic energy to a heating vessel which has a substance that converts the electromagnetic energy into heat; and
 heating, with heat formed from the conversion of electromagnetic energy into heat, a reaction vessel containing metal-containing-nanofibers which include nanofibers made of organic polymer and metal which possesses a catalytic function in forming carbon nanotubes;
 wherein the heating forms carbon nanotubes which contain metal therein by using the nanofibers as a carbon source;
 wherein the metal-containing-nanofibers are formed such that surfaces of nanofibers are coated with the metal; and
 wherein the coating on the metal-containing-nanofibers has a thickness ranging from 10 nm to 300 nm.

13. A method for manufacturing carbon nanotubes of claim 12, wherein the formed carbon nanotubes are made in a yield greater than or equal to approximately 4% based on a carbon content of the nanofibers.

14. A method for manufacturing carbon nanotubes of claim 13, wherein the electromagnetic energy is in the form of microwave radiation.

15. A method for manufacturing carbon nanotubes comprising:
 applying electromagnetic energy to a heating vessel which has a substance that converts the electromagnetic energy into heat; and
 heating, with heat formed from the conversion of electromagnetic energy into heat, a reaction vessel containing metal-containing-nanofibers which include nanofibers made of organic polymer and metal which possesses a catalytic function in forming carbon nanotubes;
 wherein the heating forms carbon nanotubes which contain metal therein by using the nanofibers as a carbon source;
 wherein the substance that converts the electromagnetic energy into heat is chosen from alumina, mullite, ferrite, silicon nitride, and silicon carbide: and
 wherein the heating is maintained the inside of the heating vessel at a temperature of 600° C. to 900° C. for 5 to 20 minutes.

16. A method of claim 15, wherein the heating vessel is formed using the substance that converts the electromagnetic energy into heat.

17. A method of claim 15, wherein the heating vessel contains the substance that converts the electromagnetic energy into heat dispersed or impregnated into a wall of the heating vessel.

* * * * *